Figure 27:
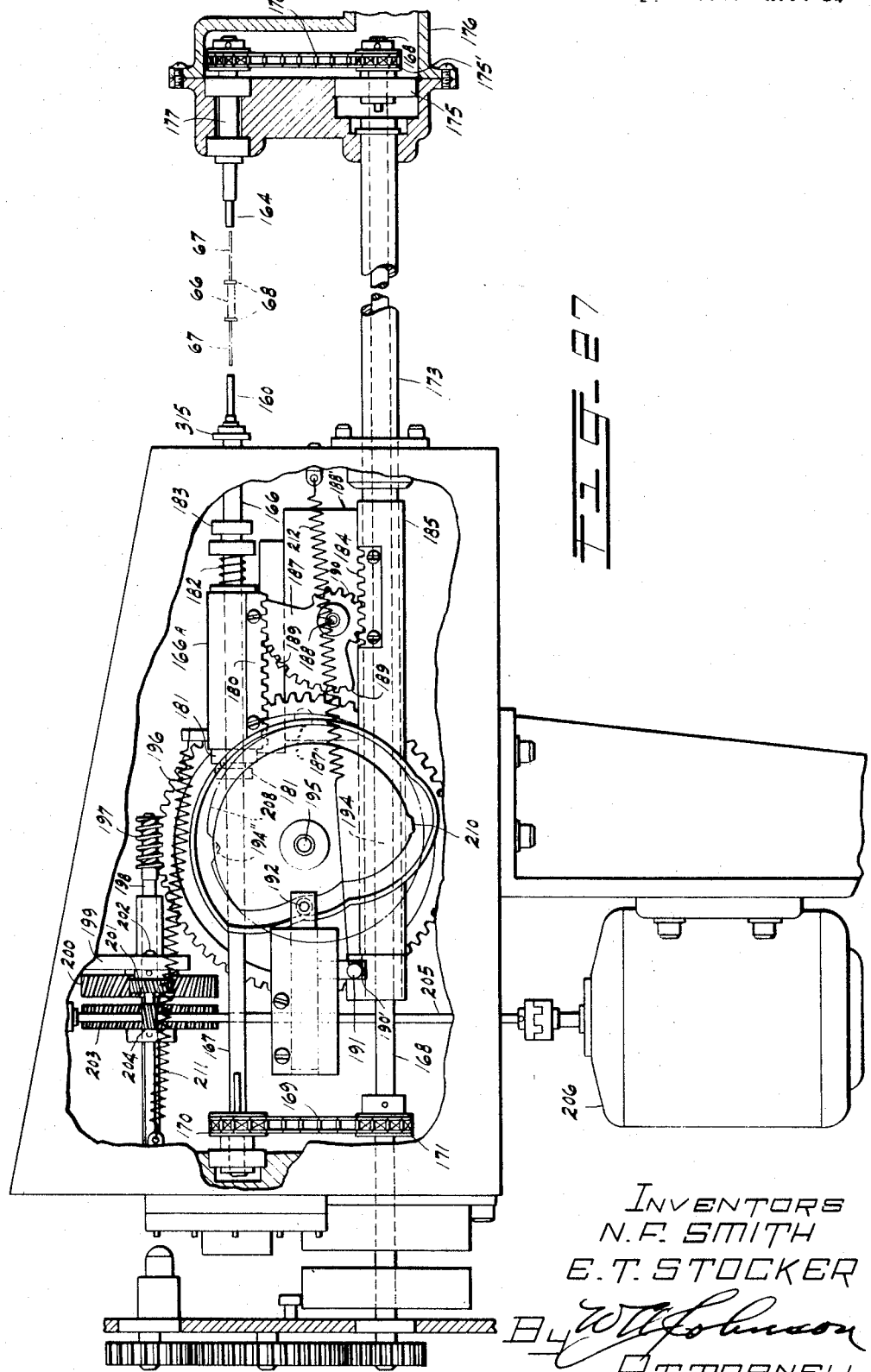

Feb. 7, 1967    N. F. SMITH ETAL    3,303,315
COIL WINDING APPARATUS
Filed April 25, 1963    12 Sheets-Sheet 1
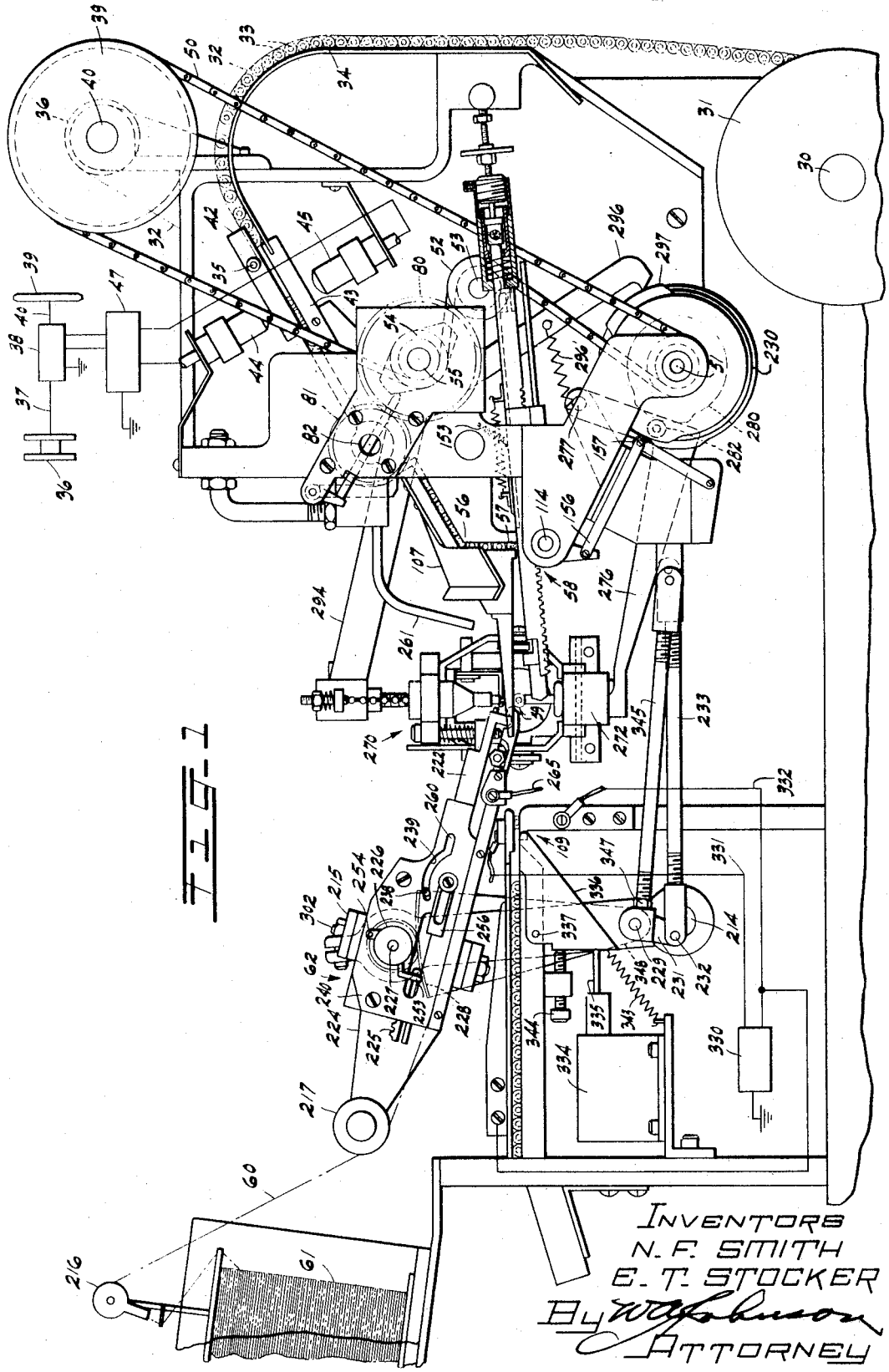
INVENTORS
N. F. SMITH
E. T. STOCKER
By W. Johnson
ATTORNEY Feb. 7, 1967 N. F. SMITH ET AL 3,303,315
COIL WINDING APPARATUS
Filed April 25, 1963 12 Sheets-Sheet 2
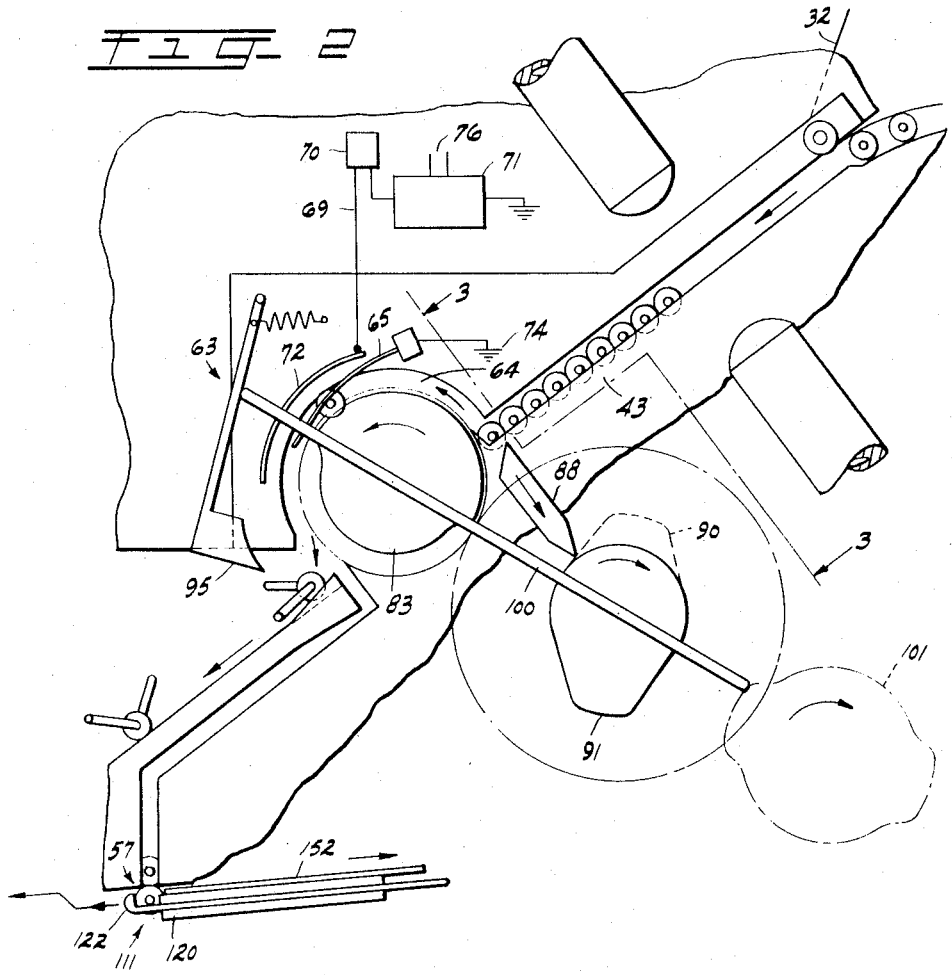
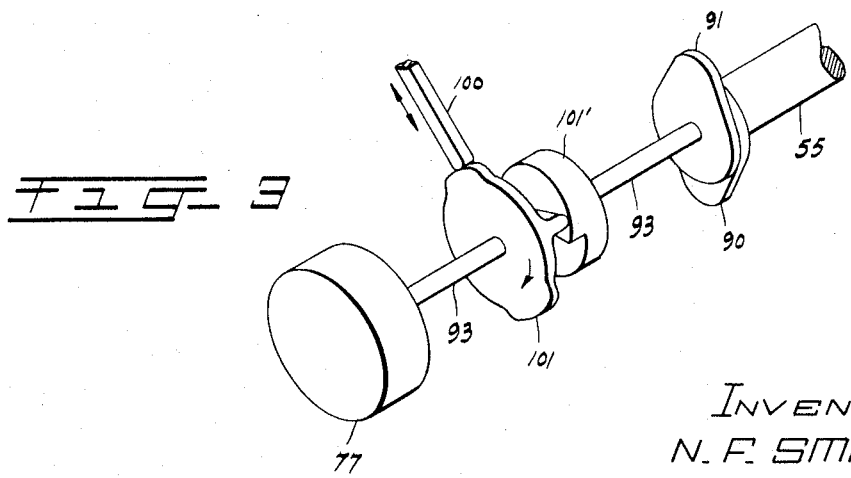
INVENTORS
N. F. SMITH
E. T. STOCKER
By W. A. Johnson
ATTORNEY

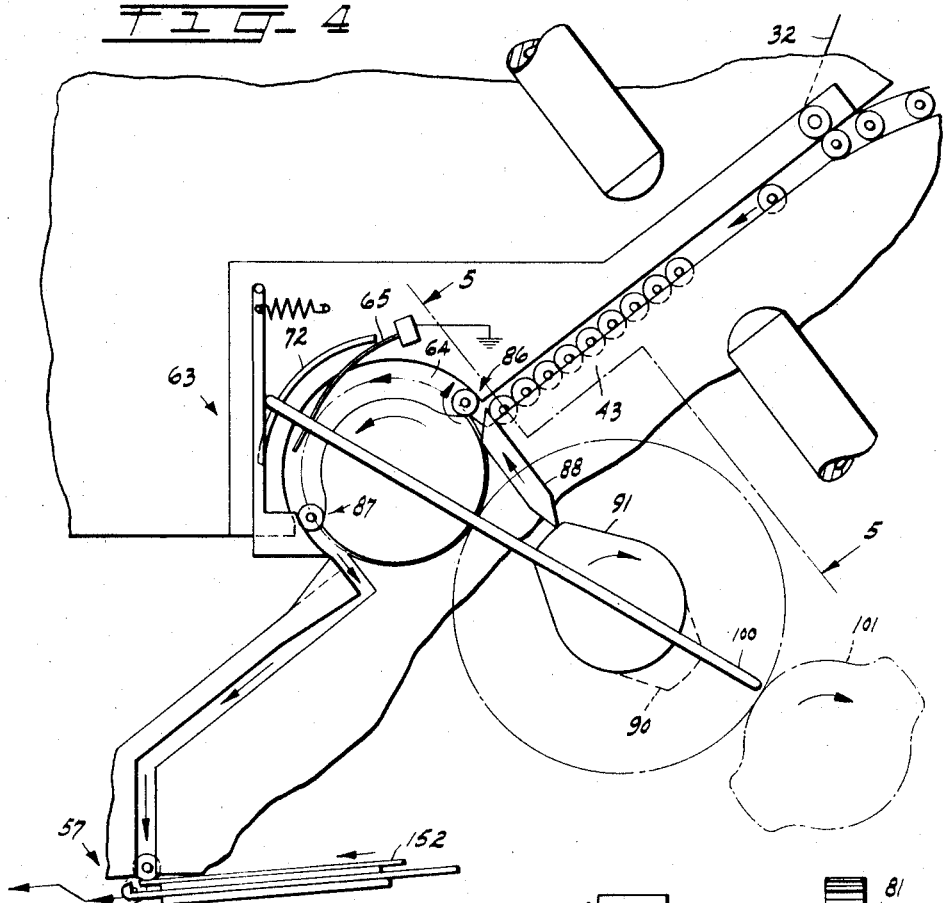
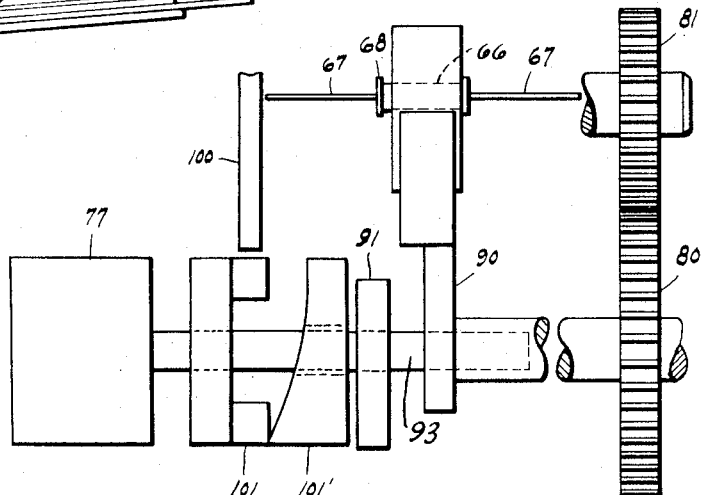

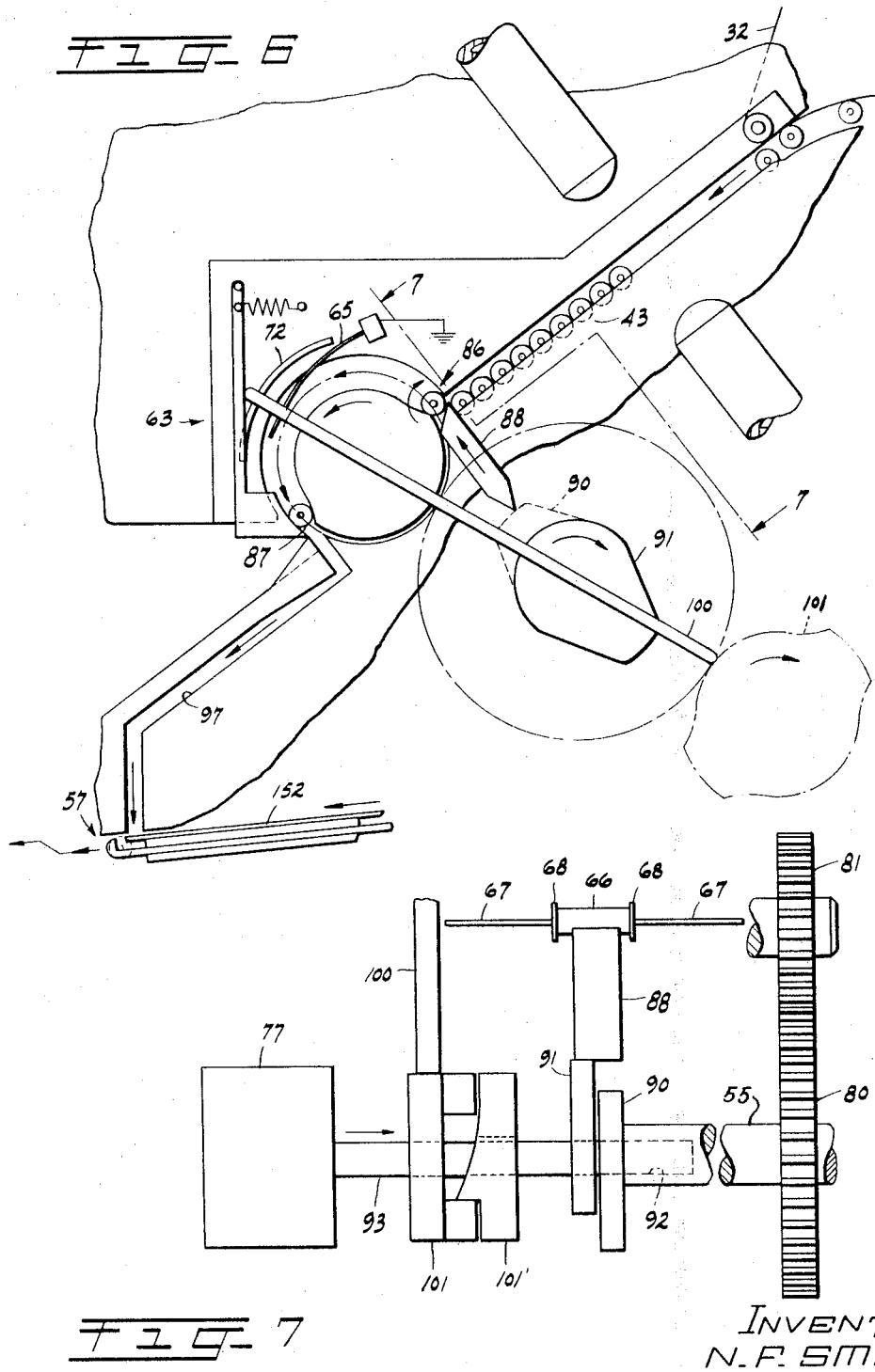

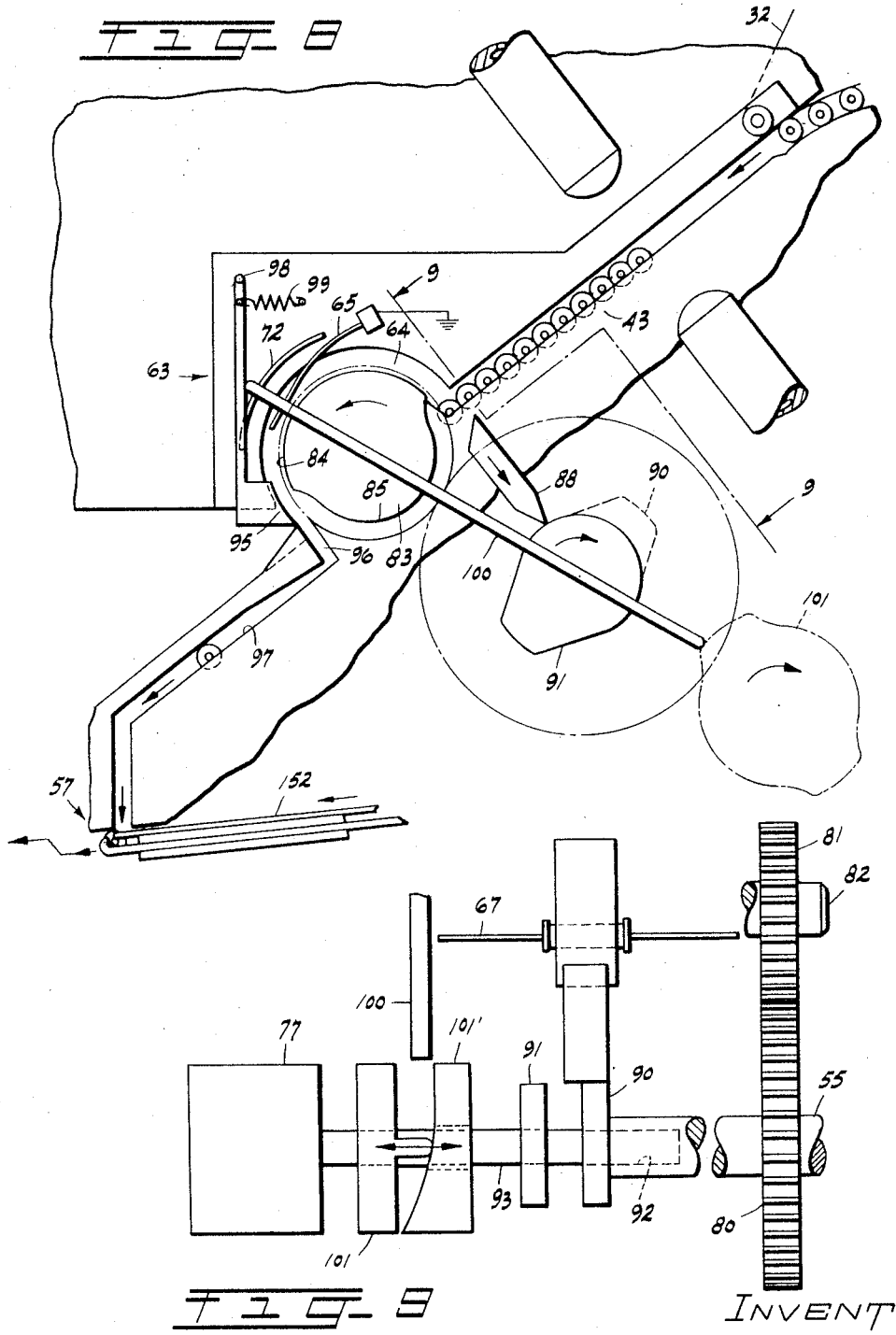

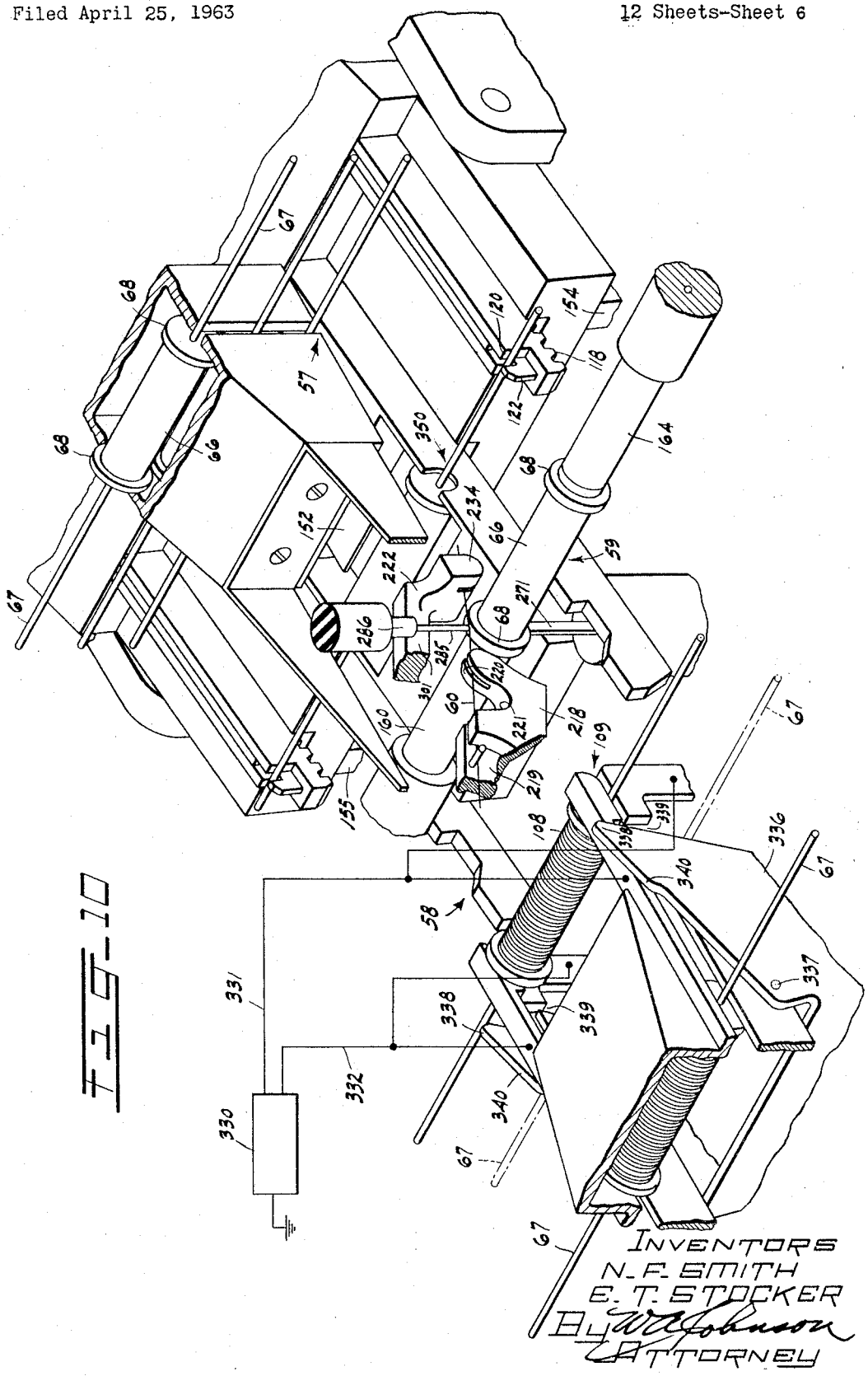

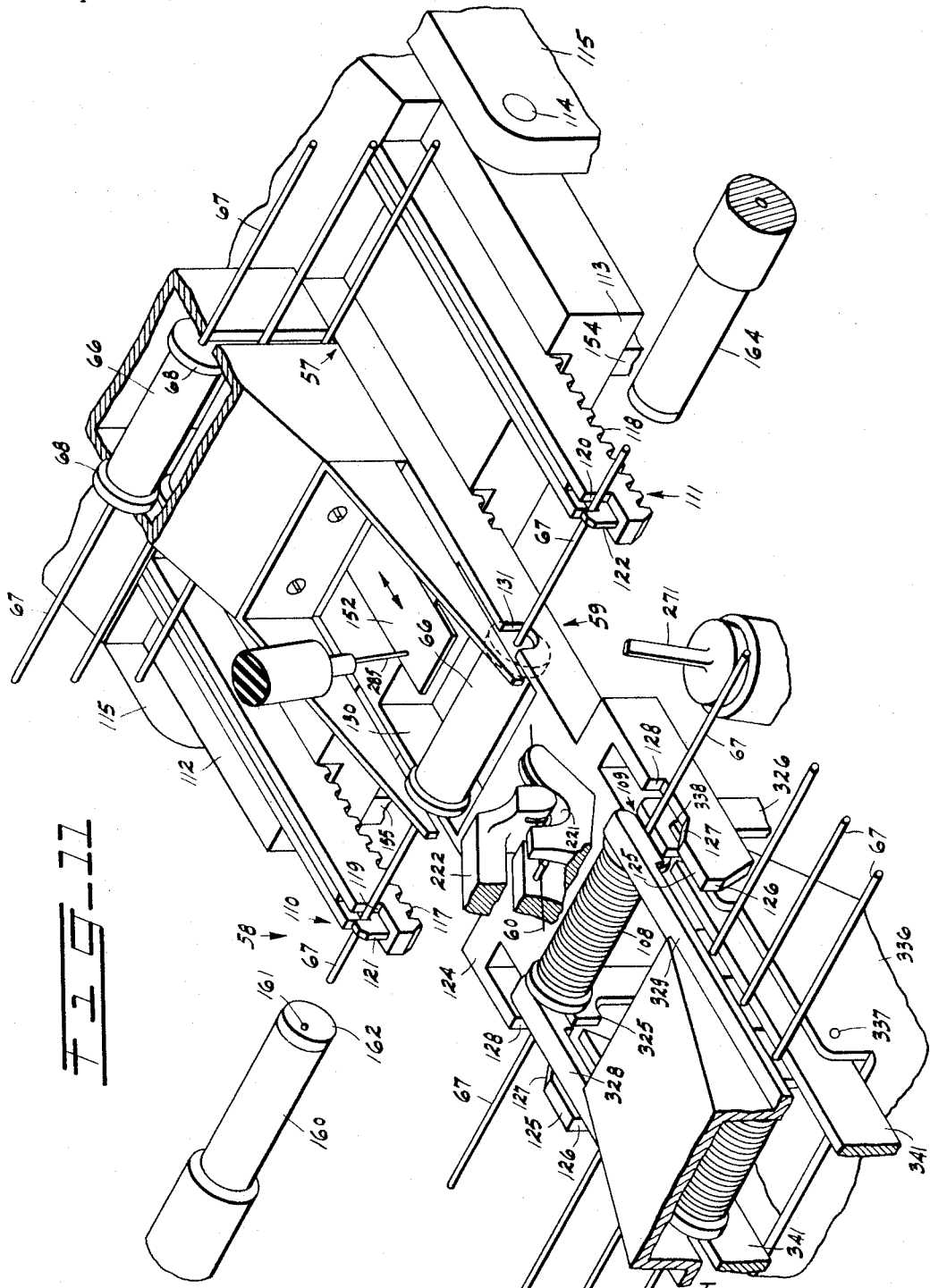

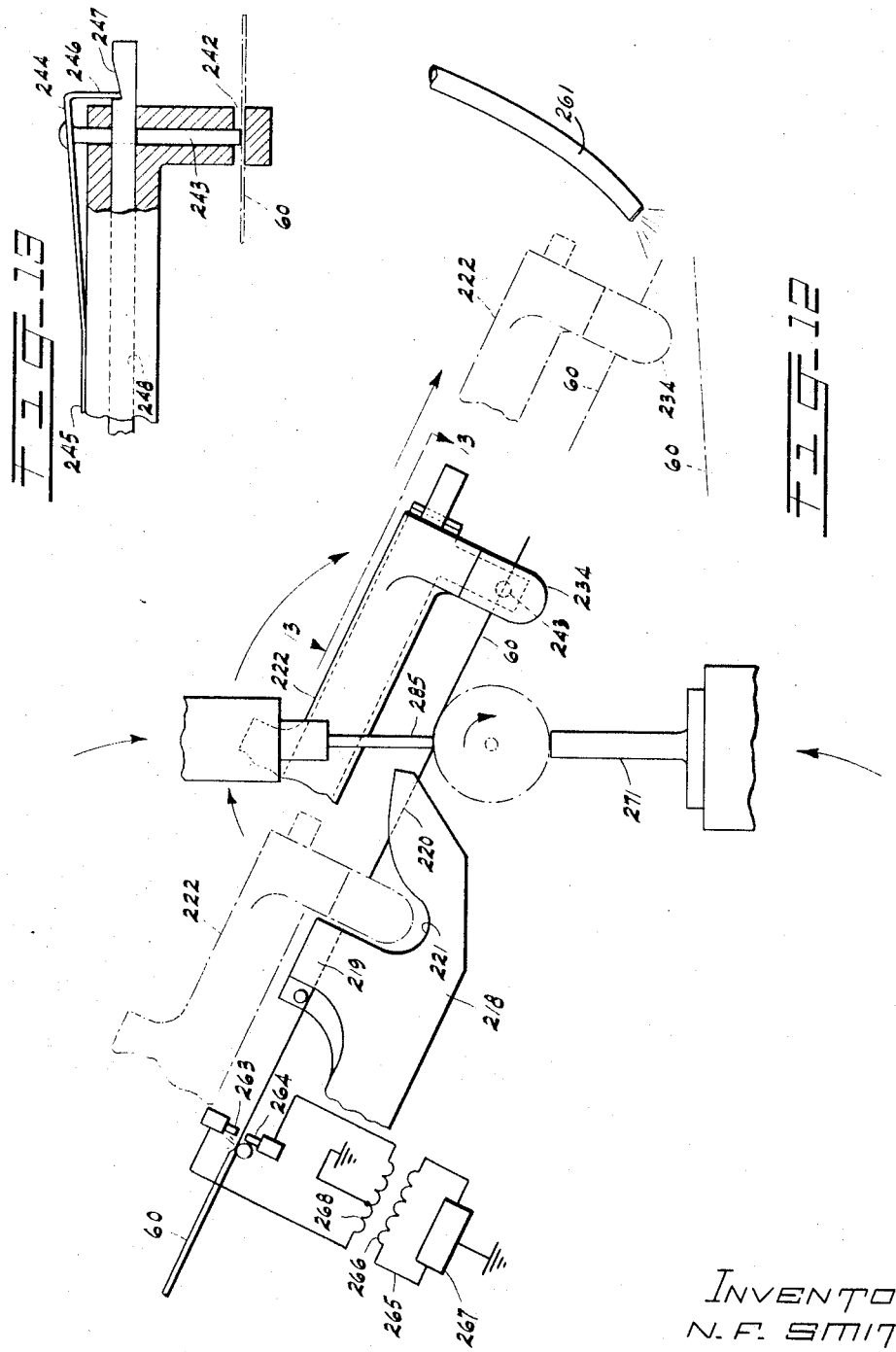

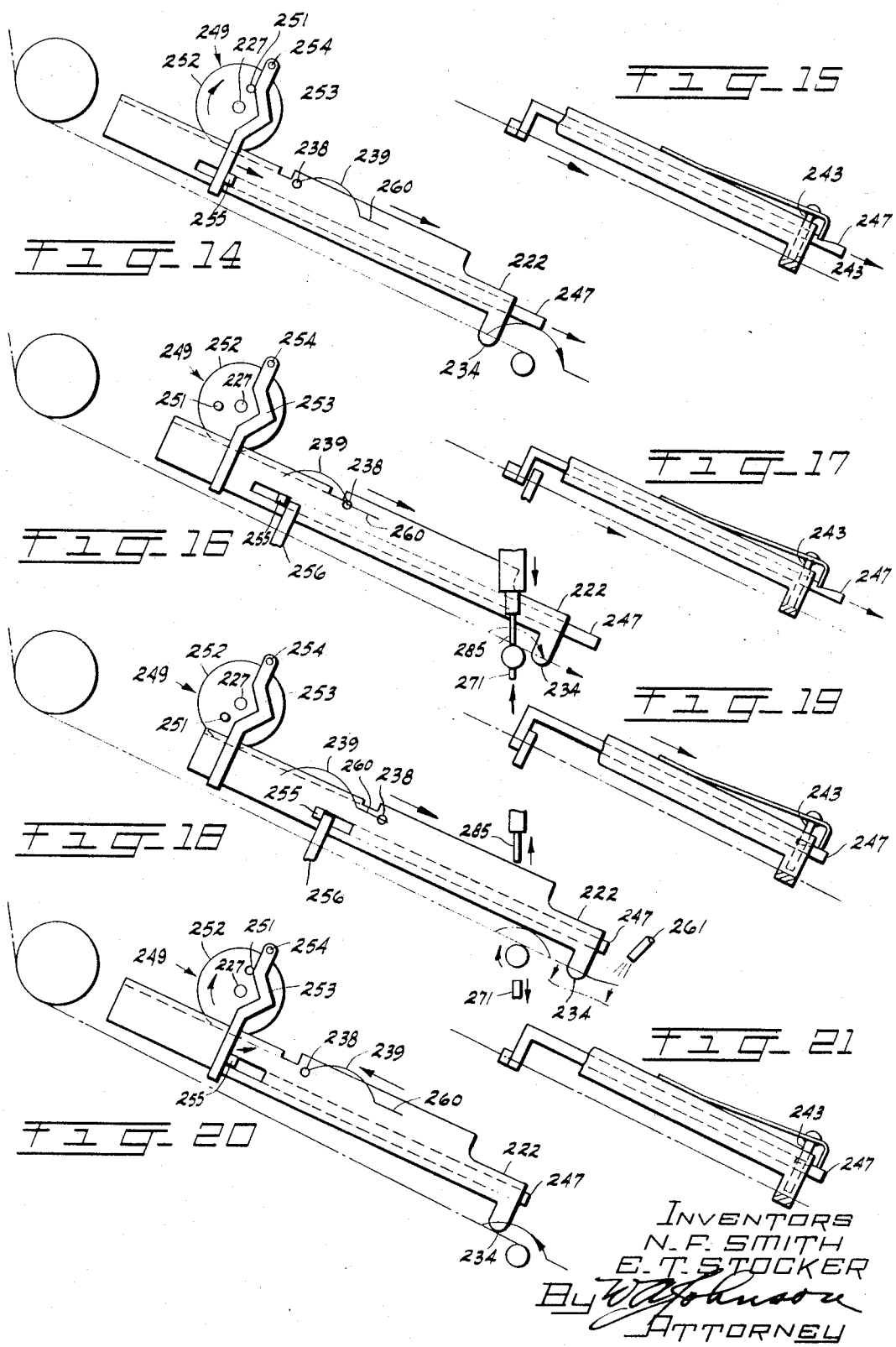

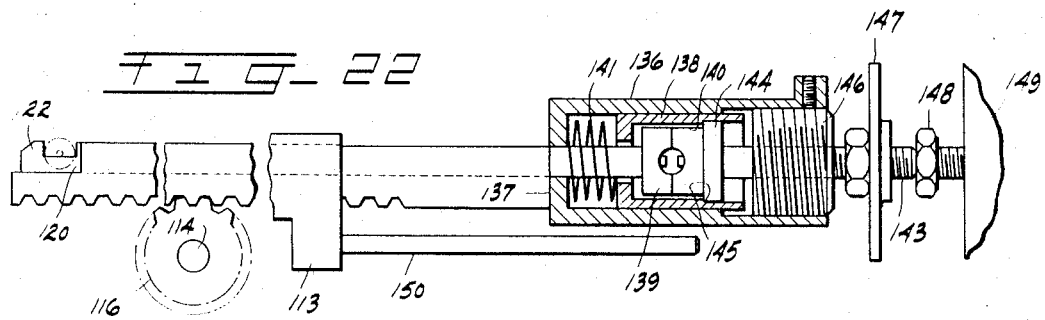
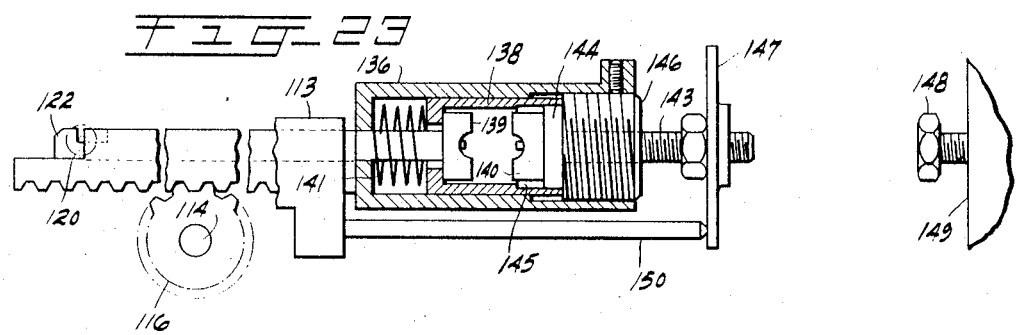
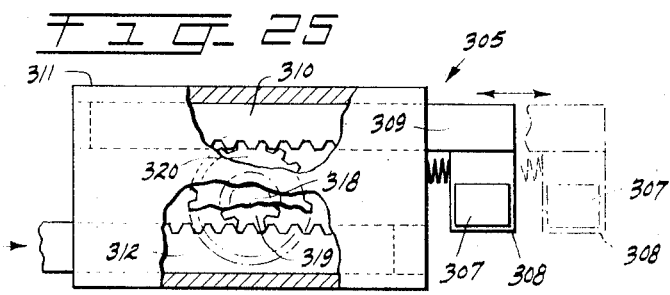
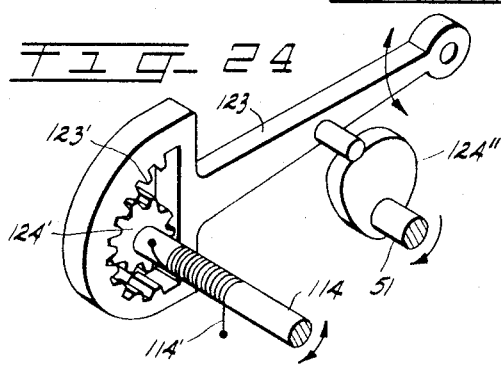

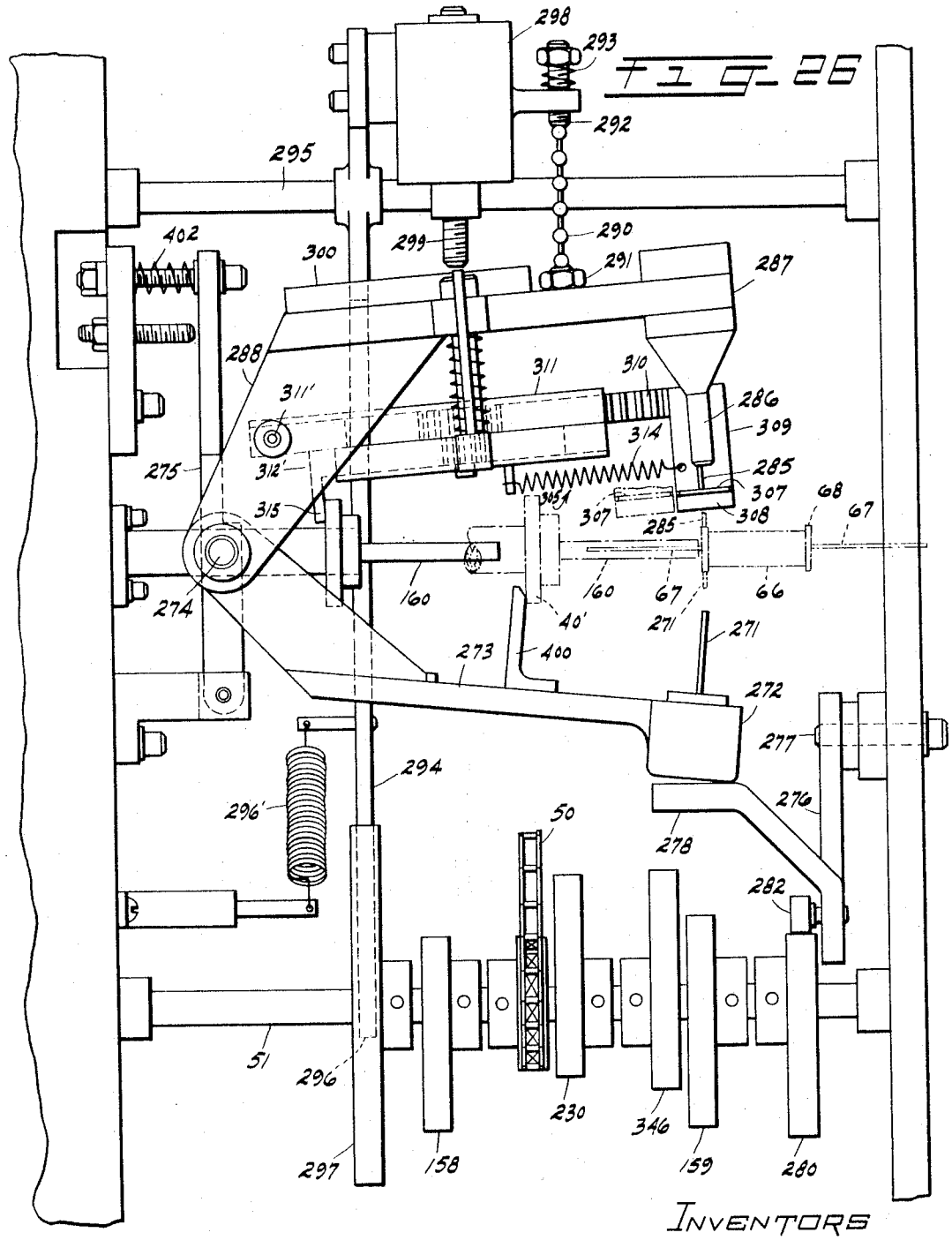

Feb. 7, 1967 N. F. SMITH ETAL 3,303,315
COIL WINDING APPARATUS
Filed April 25, 1963 12 Sheets-Sheet 12

INVENTORS
N.F. SMITH
E.T. STOCKER
BY W.L. Johnson
ATTORNEY 3,303,315
COIL WINDING APPARATUS
Norman F. Smith, Methuen, and Edward T. Stocker, Groveland, Mass., assignors to Western Electric Company, Incorporated, New York, N.Y., a corporation of New York
Filed Apr. 25, 1963, Ser. No. 275,729
26 Claims. (Cl. 219—79)

This invention relates to coil winding apparatus, particularly apparatus for winding coils of insulated wire on coil forms.

In the present instance, the coil forms are of dielectric material, circular in cross-section, and of like lengths having conductive washers fixed to the ends thereof and wire-like terminals projecting outwardly from the centers of the washers.

To facilitate handling of the coil forms they are secured successively to an adhesive-type tape so that the forms, with their terminals, will be positioned parallel with each other, and in this manner, wound with the tape on a supply reel. This tends to protect the coil forms, particularly the wire-like terminals to maintain them in alignment with the centers of their respective coil forms.

An object of the present invention is an apparatus for receiving the coil forms singly and efficiently and automatically selecting only the coil forms with straight terminals, winding coils thereon, testing the coils for continuity, and rejecting those failing to pass the test.

In accordance with the object, the apparatus includes a supply station for the coil forms to which the coil forms are moved successively and also a winding station spaced from the supply station with means to transfer the coil forms securely thereto. Means is provided at the winding station for welding a lead portion of a wire to one of the washers of a coil form after which a coil is wound on the form and the end of the coil is welded to the other washer.

Other features include a bent lead detector disposed in advance of the supply station to eject coil forms with bent leads, a flashing means for the wire in advance of the winding station to burn insulation from the portions of the wire to be welded to the washers and a continuity test station receiving the wound coils.

Other objects and advantages will be apparent from the following detailed description when considered in conjunction with the accompanying drawings wherein:

FIG. 1 is a front elevational view of the apparatus;
FIG. 2 is a schematic front elevational view of the bent terminal lead detector unit;
FIG. 3 is a sectional view taken along the line 3—3 of FIG. 2;
FIG. 4 is another schematic illustration of the other coil form feeding means through the bent terminal lead detector unit;
FIG. 5 is a sectional view taken along the line 5—5 of FIG. 4;
FIG. 6 is another schematic illustration of the coil form feeding means in the area of the bent terminal lead detector;
FIG. 7 is a sectional view taken along the line 7—7 of FIG. 6;
FIG. 8 is another schematic illustration of the coil feeding means in the area of the bent terminal lead detector;
FIG. 9 is a sectional view taken along the line 9—9 of FIG. 8;
FIG. 10 is a fragmentary isometric view of the coil form feeding means and the winding of the leading portion of the wire to the starting end of the coil form;
FIG. 11 is a fragmentary isometric view of the structures shown in FIG. 10 illustrating a different position of the parts therein;
FIG. 12 is a fragmentary front elevational view of a portion of the wire feeding means illustrating an end of the leading portion of the wire while it is being welded to the terminals;
FIG. 13 is a fragmentary detailed view taken along the line 13—13 of FIG. 12;
FIGS. 14, 15, 16, 17, 18, 19, 20 and 21 illustrate schematically various actions of the wiring feeding means, the even numbered figures being front elevational views of the wire feeding unit, while the odd numbered figures are top plan views of the forward or right portions of their respective even numbered figures;
FIGS. 22, 23 and 24 are detailed views of the terminal gripping and feeding means shown respectively in open and closed positions;
FIG. 25 is a fragmentary top plan view of a unit for wiping a top electrode used in welding the winding portion to the terminal;
FIG. 26 is a front elevational view of the welding electrodes, the driving means therefor and the wiping unit for the upper electrode; and
FIG. 27 is a vertical sectional view of the chucks for receiving the terminals of each coil form and the driving means therefor.

The apparatus, as shown in FIG. 1, has a support 30 for a supply reel 31 on which a tape 32, carrying coil forms 33, is wound so that in this manner the coil forms 33 may be supplied to the apparatus. The supply reel of coil forms secured to a tape includes a leading end of the tape, which is free of the coil forms and may be threaded into the apparatus about a guide 34 over which the coil forms may move. The leading end of the tape extends about a roller 35, mounted at a fixed position, and is secured to a takeup reel 36. The takeup reel 36 is removably secured to a shaft 37, which is connected through a clutch unit 38 to a sprocket 39. In actual practice, the shaft 37 terminates in the clutch unit 38, it being connected to one member of the clutch. The other member of the clutch is mounted on a shaft 40 upon which the sprocket 39 is mounted. Through this means after terminals of the coil forms pass beneath a fixed guide 42, the tape 32 is pulled from the coil forms and they are allowed to roll individually down a chute 43. However, the clutch unit 38 is under the control of a light 45 and a light-sensitive unit 44 interrupted by coil forms filling the chute 43 to the position shown in FIG. 1, thus operating suitable electrical means 47 to disconnect the clutch unit 38 to eliminate possible jamming of the coil forms in this area. As chute 43 empties light-sensitive unit 44 again engages clutch 38 to refill the chute. The sprocket 39, driving the shaft 40, is driven continuously by a chain 50 from a drive shaft 51, the chain extending around idler sprocket 52, of a shaft 53, and a sprocket 54 of a shaft 55.

The chute 43 extends diagonally downwardly to a point 56 and then extends directly downwardly to a supply station 57. At this station, a coil form feeding unit, indicated generally at 58, grips near the ends of the terminals of successive coil forms and moves them to a winding station indicated generally at 59 where a leading portion of a wire 60 is pulled from a supply reel 61 by a wire feeding unit 62. The leading portion of the wire, after it has been moved through a burn-off station where a portion of the insulation is removed therefrom, is welded to the washer-part of a coil form at the winding station, after which the wire feeding means serves as a guide for the wire while the coil is wound on the coil form and to also hold the wire during welding thereof to the washer portion of the other terminal.

Bent terminal lead detector

The coil form feeding means is shown schematically in FIGS. 2 to 9 inclusive and in FIG. 1, to feed the coil forms to the supply station 57. After the coil forms have been freed from the tape 32, they move downwardly along the chute 43, to the bent terminal lead detector unit indicated generally at 63. The unit 63 provides an arcuate path 64 for the coil forms, the outer portions of the path having conductive springs 65 positioned to be engaged by inner portions of the terminal leads of the coil forms. In actual structure, the coil forms shown, for example, in FIGS. 5 and 7, have a dielectric central portion 66 with terminals 67 having integral washer-like conductive portions 68 fixed to the ends of the dielectric member 66. The inner portion of the terminal lead 67 adjacent to washer 68, when moving through the arcuate path 64, will engage the conductive spring 65 and be grounded. Fixed contacts 72, mounted on, but electrically insulated from the machine frame, to be included in a circuit 69 extending from a source of electrical energy 70 to a control unit 71, are positioned beyond the conductive springs 65 so that a straight terminal lead may be moved through the arcuate path with its coil form and not engage the contact 72, but should either terminal be bent in any direction out of alignment with the centerline of the coil form, it will be caused to engage its contact 72.

Two lead lines 76 extend from the control unit 71 to a solenoid 77 FIG. 3 for a purpose hereinafter described. Turning momentarily to FIG. 1, and the continuous drive created by the chain 50, for driving, among other parts, shaft 55, a gear 80 is mounted on the shaft 55 for driving a gear 81 mounted on a shaft 82. A rubber-faced roller 83, is mounted on the shaft 82 and has one-half of its periphery with full radii as indicated at 84 and the other half of its periphery with shorter radii as indicated at 85. The trailing end of the periphery 85 receives the coil forms 66 successively at an entrance position 86. Here the coil forms enter the detector where they are engaged by the periphery 84 firmly with sufficient force pressing their dielectric coil body 66 against member 63 so as to create a rolling action of the coil forms from the entrance position 86 to an exit position 87.

As shown in FIGURES 6 and 7a loader 88 is supported for longitudinal movement toward and away from the entrance 86 and caused to ride on cams 90 and/or 91. The cam 90 is mounted on the shaft 55, which has a hollow portion 92, while the cam 91 is mounted on a shaft 93 which is rotated by but is movable axially relative to the shaft 55. Therefore, the roller 83 is driven in synchronism with the cams 90 and 91 so that a coil form may be received at the entrance position 86 and caused to roll toward the exit position 87 with the periphery 84 of the roller keeping the terminals at their inner portions closely engaging the spring contacts 65, the contacts 72 being spaced given distances away from the coil form 66 preferably near the outer ends of the terminals to detect, through their engagement with the contacts any out of line conditions of any terminal, to complete a circuit through the control unit 71.

As shown in FIGURE 8 the passageway 64 has the assistance of a gate 95 to link the passageway 64 with a vertical portion 96 of a chute 97 for all coil forms with straight terminals. The gate 95 is pivoted at 98, and urged into the position shown in FIGS. 4, 6 and 8 by a spring 99, but is adapted to be moved away from the passageway or path 64 to allow coil forms with bent terminals to drop out of the apparatus free of the passageway 96 as illustrated in FIG. 2. This is accomplished by a push-rod 100 slidable longitudinally in suitable supporting means so that one end will engage a vertical portion of the gate 95, and the other end will be caused to ride on cam 101 when that cam is in the position shown in FIG. 3. The cam 101 is fixed to the shaft 93 driven continuously with the shaft 55, but is moved axially with the shaft 93 through brief energization of the solenoid 77. This locates cams 101 and 91 in working position until reset by fixed reset cam 101′.

As shown in FIGURE 2 the arrangement of the circuit control in the unit 71 is such that the solenoid 77 will be energized for each defective coil form with bent terminal leads passing through the detector unit 63 to move the cam 101 under the push-rod 100 to open the gate 95 to reject the coil form. However, as a coil form with straight terminal leads is passed and no electrical contact is made, control unit 71 and solenoid 77 remain ineffective with gate closed. All terminal leads within a given range of concentricity will pass through the detector unit 63. The two cams 90 and 91, mounted respectively on the shafts 55 and 93, assure actuation of the element 88 to feed the coil forms successively to the bent terminal lead detector unit 63 and replace any forms rejected out of the machine.

A chute 107 FIG. 1 is positioned to receive the rejected coil forms and turn them out of the apparatus.

Coil form feeding means

The coil form feeding means or unit 58 of FIG. 1 is shown more in detail in FIGS. 10, 11, 22 and 23. The purpose of this feeding unit is to receive coil forms 66, at the supply station 57, feed them to the winding station 59 singly, and at the same time, move a finished coil 108, from a test station 109 so that the finished coil 108, at the winding station 59, may be in the same unit and fed into the test station. The feeding means for the coil forms include pairs of gripping jaws indicated generally at 110 and 111 supported by cradles 112 and 113 respectively pivotally supported on a shaft 114 journalled in suitable bearings in brackets 115. Portions of the shaft 114 have gears 116 mounted thereon, two of which engage rack-like teeth 117 and 118 of jaws 119 and 120 respectively of the pairs of gripping jaws 110 and 111. The jaws 119 and 120 are grooved longitudinally to receive and slidably support their respective companion jaws 121 and 122, which ride with the jaws 119 and 120 and are movable relative to each other into the open position as shown in FIG. 22 and in the closed position as shown in FIG. 23.

The driving means for the shaft 114 is shown in FIG. 24. A torsion spring 114′ causes a pivoted arm 123 forming a gear segment 123′ to follow the action of a cam 124″ on cam shaft 51 and to supply the force to rotate the shaft 114 counter-clockwise. The connection between the shaft 114 and the gear segment is a gear 124′. The cam 124″, in rocking the arm 123 clockwise, will rotate the gear 124′ and the shaft 114 clockwise.

A transfer member 124 has parallel members 125 with end surfaces 126 positioned to engage terminal leads 67 of a finished coil 108 in the test station 109 to move it out of the test station to allow room for the next finished coil to be moved into that station from the winding station 59. The parallel members 125 are also provided with notches 127 to receive the terminal leads of each finished coil 108 at the winding station 59 and, through the aid of shoulders 128, of the recesses 127, engage the terminal leads of the finished coil and move it into the test station 109. The transfer member 124 has a hollow portion 130 with outer wall portions notched at 131 to respectively receive the coil forms 66 at the supply station 57 where the outer ends of the terminal lead 67 will be gripped by the jaws 119–121 and 120–122.

At the beginning of the coil form feeding unit, the shaft 114 is rotated in response to cam 124″, FIG. 24 to rotate the shaft 114 to move the pairs of jaws 110 and 111 back to the position shown schematically in FIG. 2 where in open positions the jaws will register with the supply station 57, which is the exit end of the chute 97. The pairs of jaws 110 and 111 move with the transfer member 124 and at this time the opening 130 of the transfer member and the notches 131 in the side walls thereof are in alignment with the supply station 57 so that the lowermost coil form may drop into the open jaws.

The means for controlling opening and closing of the pairs of jaws 110 and 111 is illustrated in FIGS. 22 and 23. A housing 136 is fixed at 137, to each of the jaws 119 and 120. An inner shell 138 is movable in the housing 136 and has permanent magnets 139 and 140 attracted to each other movably disposed therein. The permanent magnet 139 is fixed to the adjacent end of its respective jaw 121 or 122. A spring 141 normally urges the sleeve 138 to the right tending in some instances, to move the sleeve and thereby move the magnets 139 and 140 now in close contact to bring about closing of the jaws or to hold them in certain instances where they will give a gripping action to the terminals. The permanent magnet 140 in each instance is fixed to one end of a threaded member 143 in the form of a head 144, movable in an enlarged portion of the sleeve 138 a limited distance controlled by a shoulder 145. The threaded member 143 is movable in an apertured plug 146 mounted adjustably in the housing 136. A disc-like member 147 is adjustably mounted on the threaded member 143 and an adjustable stop 148 is mounted on a fixed support 149 to be engaged by the outer end of the threaded member 143 as illustrated in FIG. 22. The disc-like member 147 is positioned to engage a pin 150 carried by the cradle 113 to bring about reduction of gripping force of the jaws 119–121 and 120–122 by causing a gap between the magnets 139 and 140.

In following the action of the structure shown in FIG. 22 during rotation of the shaft 114 and the gears 116 clockwise, the jaw 120 has moved to the right. During this movement, the threaded member 143 has engaged the stop 148 causing the magnet 140 to stop at a given position so that during the remainder of the movement of the jaw 120 the magnet 139 will be moved into engagement with the magnet 140 stopping movement to the right to the jaw 122 so that during the final movement of the jaw 120 to the right, it will be moved relative to the jaw 122 causing opening of the jaws as illustrated in this figure. Therefore, the magnets 139 and 140 will be in engagement with each other at the start of the movement of the jaw 120 to the left during rotation of the shaft 114 and gears 116 counter-clockwise. As a result, the magnetic attraction of the magnets 139 and 140 will result in closing the jaws on the terminals of the coil form received at the supply station 57 causing firm gripping of the terminal leads near the ends thereof until the disc-like member 147 reaches the stop 150 mounted on the cradle 113. This action will separate the magnets 139 and 140 enough to reduce the magnetic force holding the jaws 120 and 122 closed.

A sliding member 152, is movable with the transfer member 124, and in certain instances, relative to the gripping jaws 119–121 and 120–122 as illustrated schematically in FIGS. 2, 4, 6 and 8, so that as illustrated in FIG. 2, the bottom coil form at the supply station 57 may drop into the open jaws. The sliding member then moves beneath the next coil form at the supply station to hold the coil forms in the chute 97 until the feeding unit 110 returns to the supply station.

The cradles 112 and 113, pivotally mounted on the shaft 114, are normally urged counter-clockwise by suitable springs 153 shown in FIG. 1, so as to respond to actions of their respective cams mounted on the shaft 51. The linkage 156 and cam follower 157 controlling the cradles only one of which is shown in FIG. 1, are positioned to engage their respective cams 158 and 159 FIG. 26. The cam action for the cradle 112 causes lowering of the jaws 119 and 121 after a winding chuck 160, apertured at 161, has been moved a distance sufficient to receive the outer end of the adjacent terminal lead 67 and to clear the space so that a slidable end 162 of the chuck may be moved into engagement with the adjacent end of the coil form 66, or the terminal portion 68 thereof, at the winding station. After the chuck 160 has started its movement and has advanced to receive the outer end of the adjacent terminal lead 67 a companion chuck 164 will be moved to receive its respective terminal lead 67 after which the cradle 113 will be rocked to move the jaws 120 and 122 free of the path of the chuck 164. During the downward rocking movement of the cradle 113 about the shaft 114, the transfer member 124 is given the same rocking movement to move it free of the area of the coil form and allow the coil form to be moved by the chuck 160 from the position shown in FIG. 11 to the position shown in FIG. 10.

*Coil winding means*

The moving and driving means for the chucks 160 and 164 are shown in FIG. 27. The hollow chuck 160 is mounted on the outer end of the shaft 166 which is mounted concentric with and keyed but movable to a sprocket 170. The bearing mounted sprocket 170 is operatively connected to shaft 168 by a chain 169 driving over sprocket 171. Change gears with driving means from motor 206 drive the shaft 168, which extends through a hollow shaft 173 and is keyed to but movable through sprocket 175' and mounted in bearing 175 disposed in housing 176. The housing 176 is supported for axial movement with the hollow shaft 173 and supports a spindle 177, which in turn, supports the chuck 164. The spindle 177 is driven by the shaft 168 through a sprocket and chain connection 178. A rack-like unit 180 is disposed on the hollow thrust member 166A. A thrust bearing and collar 181 and a spring 182 are disposed in back of a collar 183 on the shaft 166. A rack-like portion 184 is mounted on the square portion 185 of the hollow shaft 173 so that movement of the rack 184 will cause axial movement of the shaft 166. A gear segment 187, mounted on a spindle 188, which in turn, is mounted on slide 188', has gear portions 189 and 190 respectively inter-engaging the racks 180 and 184, and being of different ratios with respect to each other so that movement of the rack member 184, a given distance in either direction, will cause a greater movement of the rack member 180. The hollow shaft 173, supporting the rack member 184, is notched at 190' to receive a projection 191 fixed to a cam follower 192 inter-engaging a groove of a cam 194. The cam 194 is mounted on a shaft 195 with a worm gear 196, which is driven by a worm 197. The worm 197 is mounted on a shaft 198 supported at 199 and having a gear 200 mounted thereon. The gear 200 is driven by a gear 201, mounted on a spindle 202 with a gear 203, the gear 203 being driven by gear 204 mounted on a shaft 205 of a motor 206. Therefore, the motor 206, when energized causes rotation of the chucks 160 and 164 through change gears in like directions to bring about winding of a wire on each coil form at the winding station. The motor 206 also causes driving of the cam 194 so that the various contours of a groove 208, of the cam 194 in conjunction with cam 194' will bring about predetermined axial movements of the chucks 160 and 164 to clamp and move the coil form at the winding station between the position shown in FIG. 11 and the position shown in FIG. 10. At the last position a leading portion of the wire 60 is welded to the first terminal, that is, the washer-like portion 68 thereof. The chucks 160 and 164 (FIG. 27) are held against rotation through de-energization spindle clutch and energizing spindle brake. After the welding action has been completed, the spindle clutch is energized to drive the chucks and at the same time, the motor 206 is driven to rotate the chucks so that the convolutions of the wire 60 will be distributed uniformly on the coil form. At the completion of a predetermined number of turns and fraction thereof the wire on the coil form 66, a portion 210 of the cam groove 208 will cause the final axial movement of the chucks 160 and 164 in the feeding direction to the left, FIG. 10, to position a portion of the wire across the washer-like member 68 of the second terminal this portion being located in alignment with the welding electrodes for the final welding of the coil on the coil form. Springs 211 and 212 serve to urge the chucks 160 and 164 toward their outer or starting positions.

Wire feeding unit

A wire feeding unit 62, shown in FIG. 1, is pivoted about axis 214 and rockably supported laterally in a yoke-type support 215, and is adapted to receive the wire 60 from the supply 61 over a grooved roller 216, after which the wire extends around a tension member 217 supported by the unit 62 and is then threaded through the unit. The unit 62 viewing FIGS. 10 and 12 includes a guide 218 having spaced grooved-portions 219 and 220 through which the wire is adapted to pass and a recess 221 disposed between the grooved guides or portions 219 and 220 to receive a wire in a feeder 222. The wire guide 218 is fixed to the main body 224 of the unit 62 whereas the feeder 222 is movable relative to the wire guide as illustrated schematically in FIGS. 14 to 21 inclusive. This movement is brought about through the operating mechanism of the feeding unit 62 beginning with the rack-like portion 225 at the left end of the feeder 222 positioned in engagement with one of two gears 226 mounted on a shaft 227 journalled in suitable bearings in the main body 224 of the unit. The other gear 226 is positioned to engage a gear segment 228 fixedly mounted on a shaft 229 and responsive to a cam 230, FIG. 26 mounted on a cam shaft 51, FIGS. 1 and 26. The cam 230 is adapted to rock a lever 231 mounted on the shaft 229 and connected at 232 to a rod 233 actuated by said cam. This mechanism, that is, the gear segment 228, the gear 226 and the rack 225, provide longitudinal movements for the feeder 222 in bringing about the desired actions for initially feeding a portion of the wire to a first terminal of a coil form 66 at the winding station 59. Additional means is necessary to convert portions of the straight line movements of the feeder 222 into arcuate movements to move the wire gripping end thereof, which includes a fixed jaw 234, up and over the coil form at the winding station to lay the leading end portion of the wire on the first terminal, that is, the washer-like portion 68 thereof. There is a pause in the movement of the feeder until the wire is welded after which the forward movement continues to remove the excess wire and move the wire gripping end back to its position in the recess 221 of the wire guide 218 so that it will be ready for the next length of wire to be fed to a coil form at the winding station. These arcuate movements of the feeder 222 are brought about through a pin 238, mounted on an intermediate portion of the feeder 222, and extending through a cam-like slot 239 in a cover plate 240 of the unit 62. The pin 238 is shown schematically in FIGS. 14, 16, 18 and 20 where the cam-like groove 239 is shown as a single line. In FIG. 14 the pin 238 is shown at its starting position with the feeder 222 located at the start of its operating cycle. The fixed jaw 234 as shown in FIG. 12 is located in the recess 221 where it will at a predetermined interval of time, assist in gripping the leading portion of the wire 60. The feeder 222 is notched, FIG. 13, at 242 to receive the wire 60 and through the assistance of the grooves in the wire guides 219 and 220, the portion of the wire extending through the recess 221 will be located at a definite position so that a movable jaw, such as an inner end of a pin 243, may engage this portion of the wire as illustrated in FIGS. 13 and 15 and force it against the fixed jaw 234 at the other side of the groove 242. This provides a positive grip of the wire and places it under the control of the feeder 222. The pin 243 has its outer end connected to a spring 244 which is secured fixed at 245 to the feeder 222 and has an end 246 responsive to a cam-like element 247 slidable in a groove 248 of the feeder 222. The element 247 is operated in one direction by a cam 249, which is shown in FIGS. 14, 16, 18 and 20 and has a pin 251, mounted on a disc-like member 252. The disc-like member 252 is mounted on the shaft 227 and driven thereby to cause the pin 251 to engage a lever 253 pivoted at 254, and of the contour shown in these figures, to engage a projection 255, of the element 247 to move the element in one direction to bring about closing of the jaws 234 and 243 on the wire. The spring 244 has sufficient force to hold the jaws of the feeder closed. At this time, the unit 62 FIG. 1, is rocked about its pivot 214 by cam means to pull and break the wire at the second weld. A stop 256, positioned in the back of the projection 255, serves to return the element 247 to its starting position to open the jaws of the feeder by moving the pin 243 outwardly as shown in FIG. 19 after the welding operation has been completed with the feeder 222 in the position shown in FIG. 16. Therefore, prior to the start of the movement of the feeder 222 from the broken line position shown in FIG. 12, the element 247 is actuated to cause the movable jaw or pin 243 to grip the leading portion of the wire 60 against the fixed jaw 234. This gripping action continues during movement of the feeder to place the leading portion of the wire on the first terminal, or its washer-like member 68, where this gripping action holds the wire taut prior to and during the welding operation, applying a pulling action on the leading end of the wire so that when the wire is heated sufficiently to bring about the weld, the wire will be in a hot plastic state causing breakage of the excess leading end of the wire at the far end of the weld. This excess end of the wire is moved away from the weld, as illustrated by the short straight portion 260 of the cam-like groove 239, at the end of which as illustrated in FIGS. 18 and 19, the element 247 will have been moved back to its starting position by the stop 256 and its engagement with the projection 255 to open the jaws 234 and 243 and free them of the excess length of the wire. A jet of air from an air nozzle 261 will blow this portion of the wire out of the apparatus. As soon as the feeder 222 is free of the excess length of wire it returns to its starting position with the open jaws 234 and 243 located in the recess 221, the welding electrodes having been moved to their open position.

Insulation burning unit

Each end of the wire forming the coil wound on the coil form is to be welded to the washer-like portions 68 of its respective terminals 67. The wire is insulated with a suitable dielectric material and to bring about said welding of the wire at these particular ends of each coil, the insulation must be removed at these portions. To accomplish this, electrodes 263 and 264, as shown in FIG. 12, are positioned suitable distances from the wire 60 at diametrically opposed positions so that at predetermined intervals during the advancement of the wire, a circuit 265 is closed through the primary winding 266 of a transformer by a linear counter control unit 267 to energize a circuit through a secondary winding 268 in a circuit including the electrodes 263 and 264 to produce an arcing between the electrodes 263 and 264 to burn insulation from the wire at predetermined portions which will be the portions located on the terminals 67 or the washer-like members 68 of the terminal leads during the welding operation.

Welding unit

The welding unit indicated generally at 270, is shown in detail in FIG. 26, attention also being directed to FIGS. 10, 11 and 12. A lower electrode 271, is mounted in a holder 272, disposed at the end of a lever 273, pivotally mounted at 274 on an adjustable lever 275. A cam lever 276, pivoted at 277, has an end portion 278 upon which the end portion 272 of the lever 273 rests and is responsive to a cam 280 for causing movement of the lower electrode 271 into and out of engagement with its washer-like member 68 of the terminal lead 67 in the welding position. A roller or cam follower 282, supported by the cam lever 276, rides on its respective cam 280, mounted on the cam shaft 51 FIGS. 1 and 26. An upper electrode 285 is mounted in a dielectric arm 287 of the lever 288, the lever being pivotally mounted at 274 on lever 275. A chain-like member 290, connected at 291 to the arm 287, has its upper end connected to an adjustable member 292 so that with the aid of a spring 293 the upper electrode 285 with its arm 287 are provided with a cushioned connection with the operating means therefor while under the control of a cam lever 294. The cam lever 294 is pivotally supported at 295, the contour of the lever 294 being shown more clearly in FIG. 1. The lower end 296 of the lever is held against its respective cam 297, mounted on the cam shaft 51 by a spring 296'. The upper end of the lever 294 carries a pressure switch mechanism 298 having an adjustable projection 299 to engage a surface 300 of a member mounted on the arm 287 to apply the necessary force to move the upper electrode 285 into engagement with the washer-like portion 68 of the terminal at a point where the bared portion of the wire will be located on this terminal portion as illustrated in FIG. 10. The pressure switch mechanism not only supplies the pressure for the weld but closes the welding circuit when the given pressure is applied. During movement of the upper electrode toward the terminal or terminal portion 68 in the welding position shown in FIG. 10, the lower portion of the eccentric dielectric locating member (FIG. 26) 286, which is adjusted to a predetermined dimension engages an adjacent surface 301 of the wire feeder 222 to impart lateral movement to the wire guides 219 and 220 particularly about the axis 302 FIG. 1 of the yoke 215 to assure location of the bared portion of the wire 60 beneath the upper electrode.

Electrode wiping means

As illustrated in FIGS. 25 and 26, a wiping means, indicated generally at 305, is provided to wipe the contact end of the upper electrode 285 clean of foreign particles, which may result from the welding operation. This means includes a wiping member 307, supported by a laterally extending leg 308, of an L-shaped member 309, fixed to one end of a rack 310, which is movable longitudinally in a guide 311, mounted to pivot at 311' (see FIG. 26). Another rack 312 is slidably disposed in the fixed guide 311, and is urged to the right, FIG. 25, by a spring 314, but is responsive to a collar 315 mounted on winding spindle adjacent to chuck 160 (FIG. 26). As chuck 160 nears full open (extreme left) collar 315 moves finger 312' to actuate rack and pinion FIG. 25 to move wiper 307 to the right after the upper electrode is returned to its top or open position. A shaft 318 is rotatably supported in the guide 311 and has a gear 319 mounted thereon and inter-engaging the rack 312. A larger gear 320 fixedly mounted on the shaft 318 engages the rack 310. The ratio of the gears 319 and 320 are such that the longitudinal movement of the rack 312, responsive to the movement of a collar 315 will rotate the shaft 318 a distance sufficient to cause the larger gear 320 to move the rack 310 to the right to move the wiping member 307 from the normal broken line position shown in FIG. 26 to the solid line position shown in this figure. This will bring about wiping of the lower end of the upper electrode not only during part of the forward movement but during the same portion of the return movement of the chuck 160 as it closes on the next coil form. This will return the wiping means to its normal position out of the path of the upper electrode.

Electrical testing station

The test station 109, FIGS. 1, 10 and 11 includes fixed positioned jaws 325 and 326 upon which the terminals 67 of the completed coils 108 are positioned through the action of the transfer member 124, particularly the vertical surfaces 128 thereof. The tests are made by a test unit 330, FIG. 10, connected through the terminals of a coil 108 under test on lines 331 and 332. Line 332 is connected to the pair of jaws 325 and 328 and the line 331 is connected to the other pair of jaws 326 and 329. If the coil under test fails any one of the tests, the control unit 330 is conditioned to energize a solenoid 334 to cause its core 335 to engage a portion of a gate 336 and move it counterclockwise about its pivot 337 into the position shown in FIG. 10. The gate 336, as illustrated in FIGS. 10 and 11, is U-shaped in general contour with somewhat pointed ends 338 located as illustrated in FIG. 11 beneath the normal path of the finished coils 108 which pass the test, but upon actuation of the solenoid, movable into the upper position causing the rejected coils to be moved out of the accepted path and discharged from the apparatus through outlets 339. When the gate 336 is in its normal or down position shown in FIG. 11, surfaces 340 thereof cross the outlets 339 and assist in guiding the accepted coils in their path between guides 341. A spring 343 normally urges the gate 336 into its down position shown in FIGS. 1 and 11 to rest against an adjustable stop 344. Means for rocking the wire feeding unit 62 (FIG. 1) about the axis 214 includes a cam lever 345 responsive to a cam 346 FIG. 26 not shown, mounted on a cam shaft 51 and connected at 347 to a lower portion 348 of the unit 62 when needed not only in locating the wire relative to the coil forms but in breaking the wire at the welds.

Operation

In following certain coil forms 66 through the apparatus, it will be observed that they are pulled by the tape 32, onto which they are initially mounted, from the supply reel 31 over the guide 34 to a position where the tape is removed therefrom as it passes over roller 35 to be wound on a drum or takeup reel 36. The driving action for the takeup reel is through the clutch 38 conditioned to drive the takeup reel 36 continuously until the chute 43 is filled with coil forms to the line between the light 44 and a light-sensitive unit 45. Interferences with the light to the light-sensitive unit will cause disengagement with the clutch until the coil forms in the chute 43 move beyond this position. This prevents jamming of the coil forms in the chute. The coil forms 66 while moving down the chute are caused to be subjected to the bent terminal detector 63. Here, the coil forms, through actions of the cams 90 and 91 are caused to move the element 88 to feed a coil form into the entrance 86 of the unit 63 so that the portion 84 of the roller 83 with the larger radii will engage the coil forms and cause them to rotate while moving from the entrance portion of the detector to the exit portion thereof. During this interval, if either or both terminals 67 of the coil form being processed engage their contacts 72, a circuit will be completed through the control unit 71 to control operation of a solenoid 77, FIG. 3. In the present instance, the control unit 71 is conditioned to de-energize the solenoid 77 during each operating cycle of the roller 83, when the terminals of each coil form under test in this area are straight. However, when either or both terminals of the coil form under test at this station are bent, they will engage their respective contact 72 to bring out a condition in the control unit 71 so that the solenoid 77 will be energized moving the cam 101 in the position where it will move the push rod 100 a distance sufficient to open the gate 95 as illustrated in FIG. 2 causing the rejected coil form to move in a path toward a chute 107, FIG. 1, where it will be directed out of the apparatus. However, with the gate 95 closed as illustrated in FIGS. 4, 6 and 8, the completed coil forms will be guided through passageways of the chutes 96 and 97 to the supply station 57.

At this time, the coil form feeding means of unit 58 FIGS. 1, 10, 11, 22 and 23 is operated to locate the pairs of jaws 119–121 and 120–122 in open position at the supply station as illustrated in FIG. 2 to receive the next coil form 66. This coil form is advanced to one position indicated at 350 FIG. 10 where it is ready to be moved into the winding station when the coil in the winding station has been completed. As shown in FIG. 10 one coil form is at the position 350, another coil form has been located through operation of the chucks 160 and 164 to receive through the welding operation a leading end portion of the insulated wire 60 to be wound thereon and a completed coil 108 is in the test station 109. After the coil form in the winding station has received the leading end of its wire, the chucks 160 and 164 will rotate and move axially to wind equally spaced turns of the wire on the coil forms. At the completion of the winding operation an added axial movement is applied to the coil form through movements of the chucks 160 and 164 to lay the second bared portion of the wire on the other terminal 67 or its washer-like member 68, which will then be positioned in alignment with the upper electrode for completion of the welding operation for this particular coil form. The completed coil is now identified as 108.

At this time, the completed coil 108 is returned to a position in general alignment with the coil form at the position 350 and the completed coil 108 in the test station 109. The feeding means is operated so that the feeding jaws 119–121 and 120–122 will move the coil form from position 350 (FIG. 10) into the winding station 59 (FIG. 11) holding the outer portions of the terminals 67 into alignment with the chucks 160 and 164 until the chucks are brought into engagement with the terminals. During this movement of the pairs of jaws moving the terminals of a new coil form into alignment with the chucks 160 and 164, the transfer member 124 will move the completed coil 108 from the winding station 59 to the test station 109, while at the same time, the leading ends 126 of the transfer member will move the completed coil 108 from the test station 109 forwardly. Here the coil 108 from the test station will either be rejected through operation of the gate 336 into its up position (FIG. 10) or moved along the path of the accepted coils. These various operations are synchronized by cams so that when a new coil form 66 is moved into the winding station, the motor 206 of FIG 27 rotating continuously at predetermined varying speeds will cause movement of the chucks 160 and 164 first to engage the coil form by receiving the straight terminals in the chucks and cause their innermost ends to engage the washer-like portions 68 of the terminals. During this interval, axial movement of the chucks responsive to the cams 194 and 194' (FIG. 27) and their driving means causes the chucks to move the new coil form from its position where it is initially received at the winding station to its farthest position to the right as illustrated in FIG. 10 where, through operation of the wire feeding means a bared portion of the leading end of the wire 60 is drawn across the washer-like portion 68 of the first terminal and through the assistance of the dielectric locating member 286 for the wire feeder 222 the guide 218 is subject to movement to locate the bared portion of the wire in alignment with the upper electrode and terminal washer.

The electrodes are closed on the terminal or terminal portion 68 where the wire is welded. During welding forward thrust is imparted to the feeder 222 to sever the wire at the farthest portion of the weld when that portion becomes plastic through heat. The excess portion of the wire is released from the feeder 222 and is forced by the jet of air from nozzle 261 FIG. 18 from the feeder. The electrodes are moved away to their normal or open position and the chucks 160 and 164 are rotated in unison through operation of the motor 206, change gears and spindle clutch FIG. 27. The motor 206 also causes movement of the chucks 160 and 164 in unison from the starting position shown in FIG. 10, to the final position so that during this movement a coil with uniformly spaced turns may be wound on the coil form 66. The final direction of the chucks will occur when the portion 210 of the cam 194 causes an extra movement of the cam follower 192 so that the wire guides 219 and 220 will locate the next bared portion of the wire over the washer-like portion of the adjacent terminal. The welding electrodes 271 and 285 are closed completing the welding and during this interval the wire is broken at the weld. The wire feeding means of unit 62 frees the completed coil for movement out of the winding station and into the test station. It should be understood, however, that after the first weld and with the electrodes in their open position, the feeder 222, having served in locating the initial bared portion of the wire on the first terminal or its washer-like portion 68, is freed of the excess length of the wire and returned to the recess 221 as shown in FIG. 11. While the convolutions of the wire are being wound on the coil form, the open jaws 234 and 243 of the feeder 222 straddle the wire and are held free of the wire until the coil is completely wound. The clamp is reactivated to grasp wire just prior to the second weld so that the wire can be broken as the unit 62 moves to the left.

The cam-like element 247 is moved to the right to allow the jaws 234 and 243 to close, FIG. 13 to grip the wire and condition the feeder 222 for breaking the wire during the second weld and the next feeding operation. The wire feeding unit 62, after the completion of the winding cycle of the chucks 160 is freed of the completed coil 108 at the winding station and with the movement of a new coil form 66 into the winding station, the completed coil 108 is moved to the test station 109. The feeding unit is ready to begin its next operating cycle.

The chucks 160 and 164 have again started the operating cycle to engage the coil form now present in the winding station and move it to the right to the position illustrated in FIG. 10. With the welding electrodes in their open position at the start of this interval, the feeding unit will operate to cause the feeder 222 to move in its arcuate path, as illustrated schematically in FIGS. 14 and 16, to locate the bare portion of the wire on the first terminal or its washer-like portion 68 to hold the wire under tension in this position until the welding electrodes have been caused to complete a welding circuit through the bared portion of the wire to weld it to the terminal or washer-like portion thereof. During this interval, the upper locating member 286 functions in causing any desired lateral movement of the feeder 222 to accurately locate the bared portion of the wire beneath the upper electrode and on a predetermined portion of the terminal. During the final portion of the welding operation, the feeder 222 breaks the excess lengths of the wire from the far end of the weld and releases it so that the feeder after opening of the welding electrode may return to the recess 221 to straddle the wire. As previously stated, the flashing means including the electrode 263 and 264 of FIG. 12 will operate at predetermined intervals under the control of any suitable unit 267 which may include a linear gage to cause burning of the insulation from the wire 160 at predetermined spaced positions to provide bare portions at the exact location where the start and the end of each coil is to be welded to its respective terminals.

Although the coil forms are presumed to be of like lengths they sometimes vary in this dimension. To compensate for this a finger 400 (FIG. 26) mounted on the lever 273 for the lower electrode 271 engages a collar 401 on the chuck 160 as the electrodes move toward their closed positions to cause the electrodes to be aligned with the washer portion 68 of the terminal lead for the first weld. The pivotal support 274 for the levers 273 and 288 is mounted on lever 275 which is responsive to spring 402 to bring about adjustable movements of the electrodes under the control of the finger 400 and collar 401.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for winding coils of wire on coil forms having terminals at opposing ends thereof comprising:
   a supply station for the coil forms,
   means to move coil forms successively to the supply station,
   a winding station spaced from the supply station,
   means to transfer the coil forms singly from the supply station to the winding station,
   means to convey wire to be wound on said coil forms to said winding station,
   means to weld a leading portion of a wire to one of the terminals of a coil form at the winding station,
   means operable to rotate the coil form at the winding station to cause winding of a coil of the wire on the coil form,
   means to weld the end portion of the wound coil remote from the leading portion to the other terminal, and
   means operated in advance of said portions of the wire reaching the terminals of a coil form at the winding station to burn insulation off said portions to facilitate welding of said portions to the terminals.

2. An apparatus for winding coils according to claim 1 in which:
   a bent terminal detector is disposed in advance of the supply station and operable to receive the coil forms singly and detect the presence of a bent terminal thereon.

3. An apparatus for winding coils according to claim 1 in which:
   a bent terminal detector is disposed in advance of the supply station and operable to receive the coil forms singly and detect the presence of a bent terminal thereon, and
   means responsive to the bent terminal detector to eject coil forms with bent terminals.

4. An apparatus for winding coils according to claim 1 in which:
   a test station is disposed beyond the winding station, and
   a transfer member operable to move a wound coil form from the winding station to the test station.

5. An apparatus for winding coils according to claim 1 in which:
   a test station is disposed beyond the winding station,
   a transfer member operable to move a wound coil form from the winding station to the test station and
   means at the test station to test the wound coil forms.

6. An apparatus for winding coils according to claim 1 in which:
   a test station is disposed beyond the winding station,
   a transfer member operable to move a wound coil form from the winding station to the test station,
   means at the test station to test the wound coil forms, and
   means responsive to the test to eject all wound coil forms which fail the test.

7. An apparatus for winding coils according to claim 1 in which:
   a test station is disposed beyond the winding station,
   a transfer member operable to move a wound coil form from the winding station to the test station,
   means at the test station to test the wound coil forms,
   a gate normally closing an ejecting path, and
   means responsive to the test of wound coil forms failing the test to cause opening of the gate to the ejecting path.

8. An apparatus for winding coils of insulated wire on coil forms having terminals at opposing ends thereof comprising:
   a winding station,
   means operable to feed coil forms singly to the winding station,
   companion welding electrodes normally held in open positions relative to the winding station and movable to a welding station, in the winding station, to weld portions of a wire, including a starting convolution and a final convolution of each coil of the wire to be wound on each coil form, respectively to first and second terminals of each coil form, and
   means operable to feed the wire to the welding station, including spaced guides for the wire disposed adjacent the welding station in the winding station, and including jaws adapted to grip the wire between the guides and locate the wire at the welding station.

9. An apparatus for winding coils according to claim 8 in which:
   the wire feeding means includes spaced guides for the wire disposed adjacent the welding station in the winding station,
   a wire feeder having normally open jaws straddling the wire between the guides,
   means operable to close the jaws on a leading portion of the wire after each coil is wound and before another coil form is moved into the winding station, and
   means to move the wire feeder longitudinally to cause the closed jaws to move the leading portion of the wire to the welding station.

10. An apparatus for winding coils according to claim 8 in which:
    the wire feeding means includes spaced guides for the wire disposed adjacent the welding station in the winding station,
    a wire feeder having normally open jaws straddling the wire between the guides,
    means operable to close the jaws on a leading portion of the wire after each coil is wound and another coil form is moved into the winding station,
    means to move the wire feeder longitudinally to cause the closed jaws to move the leading portion of the wire to the welding station,
    said last named means causing the closed jaws to hold the leading portion of the wire taut on the first terminal and break an excess length of said wire portion from the weld.

11. An apparatus for winding coils according to claim 8 in which:
    the wire feeding means includes spaced guides for the wire disposed adjacent the welding station in the winding station,
    a wire feeder having normally open jaws straddling the wire between the guides,
    means operable to close the jaws on a leading portion of the wire after each coil is wound and before another coil form is moved into the winding station,
    means to move the wire feeder longitudinally to cause the closed jaws to move the leading portion of the wire to the welding station,
    said last named means causing the closed jaws to hold the leading portion of the wire taut on the first terminal and break an excess length of said wire portion from the weld, and
    means operable to open the jaws of the feeder to free the excess length of the wire.

12. An apparatus for winding coils according to claim 8 in which:
    the wire feeding means includes spaced guides for the wire disposed adjacent the welding station in the winding station,
    a wire feeder having normally open jaws straddling the wire between the guides, means operable to close the jaws on a leading portion of the wire after each coil is wound and before another coil form is moved into the winding station, means to move the wire feeder longitudinally to cause the closed jaws to move the leading portion of the wire to the welding station, said last named means causing the closed jaws to hold the leading portion of the wire taut on the first terminal and break an excess length of said wire portion from the weld, means operable to open the jaws of the feeder to free the excess length of the wire, and means operable to force the excess length of the wire from the open jaws of the feeder.

13. An apparatus for winding coils according to claim 8 in which:

the wire feeding means includes spaced guides for the wire disposed adjacent the welding station in the winding station, a wire feeder having normally open jaws straddling the wire between the guides, means operable to close the jaws on a leading portion of the wire after each coil is wound and before another coil form is moved into the winding station, means to move the wire feeder longitudinally to cause the closed jaws to move the leading portion of the wire to the welding station, and a dielectric holder for one of the welding electrodes adapted to engage the wire feeder and cause lateral movement of the feeder to assure location of the portion of the wire on the first terminal to be engaged by said welding electrode.

14. An apparatus for winding coils according to claim 8 in which:

the wire feeding means includes spaced guides for the wire disposed adjacent the welding station in the winding station, a wire feeder having normally open jaws straddling the wire between the guides, means operable to close the jaws on a leading portion of the wire after each coil is wound and before another coil form is moved into the winding station, means to move the wire feeder longitudinally to cause the closed jaws to move the leading portion of the wire to the welding station, and means adapted to impart additional movements to the feeder to move the closed jaws from between the guides and lay the leading portion of the wire on the first terminal.

15. An apparatus for winding coils according to claim 8 in which:

the wire feeding means includes spaced guides for the wire disposed adjacent the welding station in the winding station, a wire feeder having normally open jaws straddling the wire between the guides, means operable to close the jaws on a leading portion of the wire after each coil is wound and before another coil form is moved into the winding station, means to move the wire feeder longitudinally to cause the closed jaws to move the leading portion of the wire to the welding station, means adapted to impart additional movements to the feeder to move the closed jaws from between the guides and lay the leading portion of the wire on the first terminal, said last named means also being adapted to impart like additional movements to the feeder on its return to locate the jaws between the guides.

16. An apparatus for winding coils of insulated wire on coil forms having terminals at opposing ends thereof comprising:

a supply station for the coil forms, a winding station, rotatable chucks at the winding station adapted to receive the terminals of successive coil forms and rotate the coil forms to wind coils of insulated wire thereon, pairs of jaws movable into open positions to receive terminals of successive coil forms at the supply station, means operable to move the pairs of jaws between the supply station and the winding station to successively align terminals of coil forms with the chucks, means operable at the supply station to open the pairs of jaws, and means operable to close the pairs of jaws, including magnets mounted on portions of the pairs of jaws.

17. An apparatus for winding coils of wire on coil forms according to claim 16 in which:

means is operable at the supply station to open the pairs of jaws, and means creating magnetic forces to close the pairs of jaws on their terminals.

18. An apparatus for winding coils of wire on coil forms according to claim 16 in which:

means is operable at the supply station to open the pairs of jaws, means creating magnetic forces to close the pairs of jaws on their terminals, and means to reduce clamping pressure of the pairs of jaws when the terminals of the coil form held thereby are aligned with the chucks.

19. An apparatus for winding coils of wire on coil forms according to claim 16 in which:

a mechanism is operable to move the chucks axially relative to each other to close the chucks on the coil form at the winding station and move the coil form to a starting position for winding from first to last turns of a coil of an insulated wire thereon.

20. An apparatus for winding coils of insulated wire on coil forms according to claim 16 in which:

a mechanism is operable to move the chucks axially relative to each other to close the chucks on the coil form at the winding station and move the coil form to a starting position for winding from first to last turns of a coil of an insulated wire thereon, and a mechanism operable to drive the chucks in like directions about their axes to wind turns of the insulated wire on the coil form.

21. An apparatus for winding coils of insulated wire on coil forms according to claim 16 in which:

a mechanism is operable to move the chucks axially relative to each other to close the chucks on the coil form at the winding station and move the coil form to a starting position for winding from first to last turns of a coil of an insulated wire thereon, a mechanism operable to drive the chucks in like directions about their axes to wind turns of the insulated wire on the coil form, the chuck moving mechanism being adapted to move the chucks away from the starting position toward a finishing position to cause spacing of the turns of wire on the coil form.

22. An apparatus for winding coils of insulated wire on coil forms according to claim 16 in which:

a mechanism is operable to move the chucks axially relative to each other to close the chucks on the coil form at the winding station and move the coil form to a starting position for winding from first to last turns of a coil of an insulated wire thereon, means to feed a leading end of the insulated wire to a first terminal of the coil form at the starting position, welding electrodes normally held in open position, and means to close the electrodes on a portion of the wire and first terminal of the coil form to weld the first turn of the coil to the first terminal.

23. An apparatus for winding coils of wire on coil forms according to claim 16 in which:

a mechanism is operable to move the chucks axially relative to each other to close the chucks on the coil form at the winding station and move the coil form to a starting position for winding from first to last turns of a coil of an insulated wire thereon, means to feed a leading end of the insulated wire to a first terminal of the coil form at the starting position, welding electrodes normally held in open position, means to close the electrodes on a portion of the wire and first terminal of the coil form to weld the first turn of the coil to the first terminal, a mechanism operable to drive the chucks in like directions about their axes to wind turns of the wire on the coil form, means included in the moving mechanism for the chucks to cause them to move the coil forms to locate an end portion of the last turn of the coil on a second terminal of the coil form, and means operable to cause the electrodes to weld the end portion of the last turn of the coil to the second terminal.

24. An apparatus for winding coils of insulated wire on coil forms according to claim 16 in which:

a mechanism is operable to move the chucks axially relative to each other to close the chucks on the coil form at the winding station and move the coil form to a starting position for winding from first to last turns of a coil of an insulated wire thereon, and means operable to move the pairs of jaws out of paths of movement of the chucks after the chucks have received ends of their respective terminals.

25. An apparatus for winding coils of insulated wire on coil forms according to claim 16 in which:

a mechanism is operable to move the chucks axially relative to each other to close the chucks on the coil form at the winding station and move the coil form to a starting position for winding from first to last turns of a coil of an insulated wire thereon, means to feed a leading end of the insulated wire to a first terminal of the coil form at the starting position, welding electrodes normally held in open position, means to close the electrodes on a portion of the wire and first terminal of the coil form to weld the first turn of the coil to the first terminal, and means operable to cause burning of the insulation from the portion of the wire which is to be a leading end of the first turn of the coil to facilitate welding of the wire to the first terminal.

26. An apparatus for winding coils of insulated wire on coil forms according to claim 16 in which:

a mechanism is operable to move the chucks axially relative to each other to close the chucks on the coil form at the winding station and move the coil form to a starting position for winding from first to last turns of a coil of an insulated wire thereon, means to feed a leading end of the insulated wire to a first terminal of the coil form at the starting position, welding electrodes normally held in open position, means to close the electrodes on a portion of the wire and first terminal of the coil form to weld the first turn of the coil to the first terminal, and means operable at predetermined spaced intervals to cause burning of the insulation from portions of the wire which are to be respectively the start of the first turn and the end of the last turn of the coil to facilitate welding of the bared portions of the wire to the first and second terminals respectively.

References Cited by the Examiner
UNITED STATES PATENTS

| | | | |
|---|---|---|---|
| 2,666,120 | 1/1954 | Chanowitz | 140—71.6 |
| 2,976,894 | 3/1961 | Philip | 242—7 |
| 3,090,569 | 5/1963 | Beushausen | 242—9 |
| 3,106,351 | 10/1963 | Fulton | 242—9 |

RICHARD M. WOOD, *Primary Examiner.*

ANTHONY BARTIS, *Examiner.*

B. A. STEIN, *Assistant Examiner.*